US006870502B1

(12) United States Patent
Zaugg

(10) Patent No.: US 6,870,502 B1
(45) Date of Patent: Mar. 22, 2005

(54) ADVANCED ASYNCHRONOUS PULSE DETECTOR

(75) Inventor: David A. Zaugg, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/651,899

(22) Filed: Aug. 29, 2003

(51) Int. Cl.[7] .............................................. G01S 7/28
(52) U.S. Cl. ...................... 342/159; 342/160; 342/162; 342/89; 342/195; 342/194; 342/91
(58) Field of Search ............................. 342/89, 91–95, 342/115, 116, 159, 160, 162, 192, 194–196

(56) References Cited

U.S. PATENT DOCUMENTS

| 3,990,076 | A | * | 11/1976 | Naidich | 342/91 |
|---|---|---|---|---|---|
| 4,528,565 | A | | 7/1985 | Hauptmann | 342/91 |
| 4,914,441 | A | | 4/1990 | Brookner | 342/161 |
| 5,293,369 | A | * | 3/1994 | Melas et al. | 369/59.22 |
| 5,943,003 | A | | 8/1999 | Shollenberger | 342/94 |
| 5,990,824 | A | | 11/1999 | Harrison | 342/160 |
| 5,995,499 | A | * | 11/1999 | Hottinen et al. | 370/337 |
| 6,229,475 | B1 | | 5/2001 | Woolley | 342/93 |
| 6,577,269 | B2 | * | 6/2003 | Woodington et al. | 342/196 |
| 6,798,375 | B2 | * | 9/2004 | Brosche | 342/159 |
| 6,809,681 | B1 | * | 10/2004 | Niechayev | 342/159 |
| 6,810,485 | B2 | * | 10/2004 | McEwen et al. | 713/503 |
| 6,811,291 | B1 | * | 11/2004 | Short, III | 324/76.19 |
| 2002/0150184 | A1 | * | 10/2002 | Hafeez et al. | 375/346 |
| 2002/0154054 | A1 | | 10/2002 | Small | 342/201 |
| 2003/0021249 | A1 | * | 1/2003 | Kim et al. | 370/335 |
| 2003/0053526 | A1 | * | 3/2003 | Reznik | 375/148 |
| 2003/0198305 | A1 | * | 10/2003 | Taylor et al. | 375/341 |
| 2004/0120275 | A1 | * | 6/2004 | Zheng et al. | 370/320 |

FOREIGN PATENT DOCUMENTS

| GB | 2074807 | | 4/1981 | | |
|---|---|---|---|---|---|
| JP | 411304914 | A | * 11/1999 | ........... | G01S/13/52 |
| JP | 2000171556 | A | * 6/2000 | ........... | G01S/13/93 |

OTHER PUBLICATIONS

"Reduction of second–time–around target echoes in MTD radars through the combined use of intra–batch PRT staggering and asynchronous interference blanking", Di Lazzaro, M.; Naldi, M.; Principe, M.;Radar 92. Int'l Conf, Oct. 12–13, 1992 Ps:203–205.*

"Prime sequences for asynchronous pulse repetition interval agile radar", Shaar, A.A.; Woodcock, C.E.; Davies, P.A.;Aerospac and Electronic Systems, IEEE Transactions on, vol. 35, Issue: 2, Apr. 1999 Ps:543–548.*

"Bayesian multiuser detection for CDMA system with unknown interference", Lili Wu; Guisheng Liao; Chao Wang; Yong Shang; Communications, 2003. ICC '03. IEEE Int'l Conf on, vol: 4, May 11–15, 2003 Ps:2490–2493.*

"A Kalman filter based registration approach for asynchronous sensors in multiple sensor fusion applications", Yifeng Zhou;Acoustics, Speech, and Signal Processing, 2004. Proceedings. (ICASSP '04). IEEE int'l Conf on, vol.: 2, May 17–21, 2004 Ps:293–296.*

* cited by examiner

Primary Examiner—John B. Sotomayor
(74) Attorney, Agent, or Firm—Renner, Otto, Boisselle & Sklar, LLP

(57) ABSTRACT

An asynchronous pulse detector including a data estimator which estimates the return signal based on the corrected return signal, a detector for detecting an asynchronous pulse in the return signal, and a selector for selectively outputting the estimated return signal in place of the return signal as the corrected return signal in the event the detector detects an asynchronous pulse in the return signal.

21 Claims, 4 Drawing Sheets

ADVANCED ASYNCHRONOUS PULSE DETECTOR

TECHNICAL FIELD

The invention relates generally to radar systems and more particularly to mutual interference mitigation in such radar systems.

BACKGROUND OF THE INVENTION

As is known in the art, radar systems, such as pulse radar systems, are used to determine the range and/or relative velocity of an object. Radar pulses are transmitted at a rate referred to as the pulse repetition frequency (PRF). The time interval between successive pulses is referred to as the pulse repetition time (PRT). During a predetermined time after pulse transmission, radar return signals are sampled, or range gated, by the radar signal. That is, based on the difference in time between pulse transmission and the time which the sample is taken, each one of the samples corresponds to a range, or distance, between the radar system and the object producing the sampled return. The process is referred to as range gating, where each time a sample is taken represents a range cell, or gate, of the return produced by the object at the range corresponding to the time at which the sample is taken.

In order to determine the velocity of the object, the radar returns from a plurality of transmitted radar pulses are processed. More particularly, in a pulse Doppler radar each set of radar returns from a plurality of consecutively transmitted radar pulses is referred to as a dwell. The radar system produces a plurality of consecutive dwells. For each dwell, the radar system determines the average frequency of an object at one of a plurality of contiguous range gates. Fine velocity resolution generally requires a large number of radar returns per dwell (i.e., a relatively large data collection period). In a pulse radar system without Doppler processing, the time difference in the return delay of pulses can be compared to determine relative velocity.

In the event two or more pulse radar systems are located in proximity to each other and operate in or near the same frequency band, crippling mutual interference can occur. The interference between systems is characterized by pulses from one system appearing repeatedly in the same range gate of another system, usually at irregular intervals. Although the systems use different pulse repetition times (PRTs), the pulses from one system often line up in time with the pulses from another system in the other system's receiver. To each individual radar receiver, this appears as either an impulse added to the incoming data stream or a suppression at one point in time in the incoming data steam.

The effects of these asynchronous pulses are detrimental because they often can cover up any target signals preventing the target from being detected or causing false alarms. In a pulse Doppler radar this happens in the Fast Fourier Transform (FFT) of the received signal. In a pulse radar without Doppler processing, this happens due to ringing of the asynchronous pulses through the moving target indicator (MTI) filter. The PRT sets are typically chosen to maximize the time interval between interfering pulses, but it is impossible to mitigate the interfering pulses entirely.

In the past, asynchronous pulse detectors have been developed to address problems associated with interfering pulse radar systems. However, the asynchronous pulse detectors did have some shortcomings. For example, such asynchronous pulse detectors replaced asynchronous pulses with previous data samples. This could cause problems in radar receiver designs where clutter was not tuned to zero, for instance. The replacement data was taken from the input of the asynchronous pulse detector. This meant that during a false alarm, an asynchronous pulse could be inserted into the data stream rather than removed. Moreover, the asynchronous pulse detector could not remove more than one consecutive asynchronous pulse at a time, and asynchronous pulses often appear consecutively in groups of more than one.

In view of the aforementioned shortcomings associated with conventional asynchronous pulse detectors in pulse radar systems, there is a strong need in the art for an improved asynchronous pulse detector for detecting and removing asynchronous pulses. More specifically, there is a strong need in the art for an asynchronous pulse detector which is not as susceptible to inserting an asynchronous pulse into the data stream rather than removing it in the case of a false alarm. Moreover, there is a strong need in the art for an asynchronous pulse detector capable of removing consecutive asynchronous pulses appearing even in groups of two or three from the data stream.

SUMMARY OF THE INVENTION

The present invention relates to an advanced asynchronous pulse detector for use in pulse radar systems. The asynchronous pulse detector includes an estimator which uses the output of the asynchronous pulse detector to estimate replacement data. Since the output of the asynchronous pulse detector is theoretically free of asynchronous pulses, the estimator is much less likely to calculate replacement data from data containing asynchronous pulses. This greatly reduces the probability of false alarms causing the insertion of asynchronous pulses into the output data. In addition, the asynchronous pulse detector is designed so as to be capable of removing asynchronous pulses appearing in groups such as two or three.

According to one aspect of the invention, a pulse radar receiver is provided. The receiver includes front end circuitry for receiving a pulse radar return signal, an asynchronous pulse detector for detecting and removing asynchronous pulses from the return signal and outputting a corrected return signal, and radar processing circuitry for processing the corrected return signal to produce a radar output. The asynchronous pulse detector includes a data estimator which estimates the return signal based on the corrected return signal, a detector for detecting an asynchronous pulse in the return signal, and a selector for selectively outputting the estimated return signal in place of the return signal as the corrected return signal in the event the detector detects an asynchronous pulse in the return signal.

In accordance with another aspect of the invention, a method of processing a pulse radar return signal is provided. The method includes the steps of receiving a pulse radar return signal, detecting and removing asynchronous pulses from the return signal and outputting a corrected return signal, and processing the corrected return signal to produce a radar output. The step of detecting and removing asynchronous pulses includes estimating the return signal based on the corrected return signal, detecting an asynchronous pulse in the return signal, and outputting the estimated return signal in place of the return signal as the corrected return signal in the event an asynchronous pulse is detected in the return signal.

According to yet another aspect of the invention, an asynchronous pulse detector is provided for detecting and removing asynchronous pulses from an input signal and outputting a corrected input signal. The asynchronous pulse detector includes a data estimator which estimates the input signal based on the corrected input signal, a detector for detecting an asynchronous pulse in the input signal; and a selector for selectively outputting the estimated input signal in place of the input signal as the corrected input signal in the event the detector detects an asynchronous pulse in the input signal.

In accordance with still another aspect of the invention, a canceler is provided for identifying asynchronous pulses in an input signal. The canceler includes an input for receiving the input signal, and means for detecting a plurality of consecutive asynchronous pulses in the input signal.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
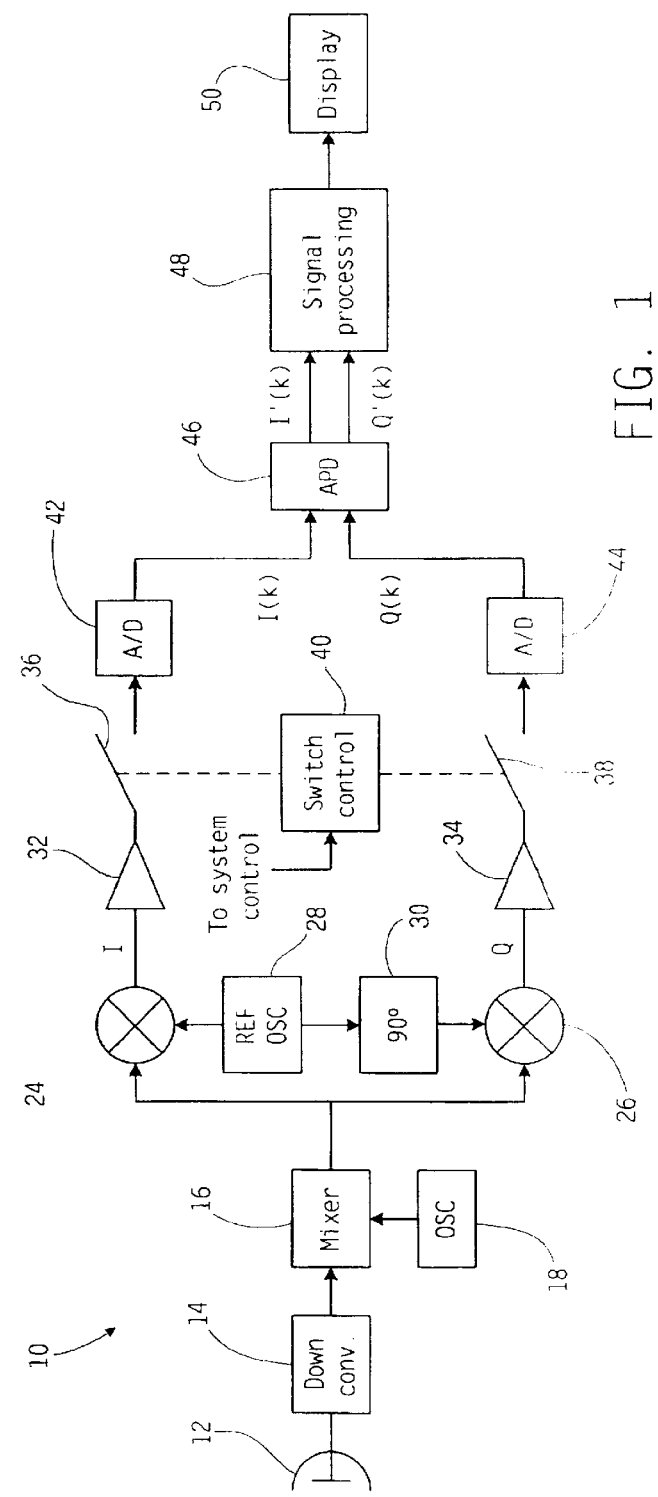
FIG. 1 is a block diagram of a pulse radar system including an advanced asynchronous pulse detector in accordance with an embodiment of the present invention.

The present invention will now be described with reference to the drawings, wherein like reference numerals are used to refer to like elements throughout. Those of ordinary skill in the art will recognize that the teachings of the present invention may be appreciated in analog, digital or software implementations, or a combination thereof.

FIG. 1 shows the salient portions of an exemplary radar receiver processing system 10 incorporating the teachings of the present invention. The system 10 includes a conventional radar antenna 12 which provides rf radar signals to a downconverter 14. The output of the downconverter 14 is input to a mixer 16 driven by a local oscillator 18. A single receiver channel is provided although the particular implementation is not critical to the invention. It is understood that the channel(s) may be processed separately or multiplexed as is common in the art. Nor is the invention limited to any particular implementation by which range cells are generated.

The output of the mixer 16 is input to each of quad mixers 24 and 26. I and Q signals are generated by the quad mixers 24 and 26, respectively. The I mixer 24 is supplied with a signal by a reference oscillator 28 while the Q mixer 26 is supplied with the same signal shifted in phase by a 90 degree phase shifter 30. The outputs of the quad mixers 24 and 26 are amplified by low noise amplifiers 32 and 34 and sampled by switches 36 and 38, respectively.

The switches 36 and 38 are actuated by a switch control 40. The switch control 40 closes the switches 36 and 38 once per range gate (or interval) for each range under the command of a conventional radar system controller (not shown). The pulses are digitized by analog-to-digital (A/D) converters 42 and 44. The A/D converters 42 and 44 thereby provide digitized samples I(k) and Q(k), respectively, of the received return signal per range gate.

Figure 3:
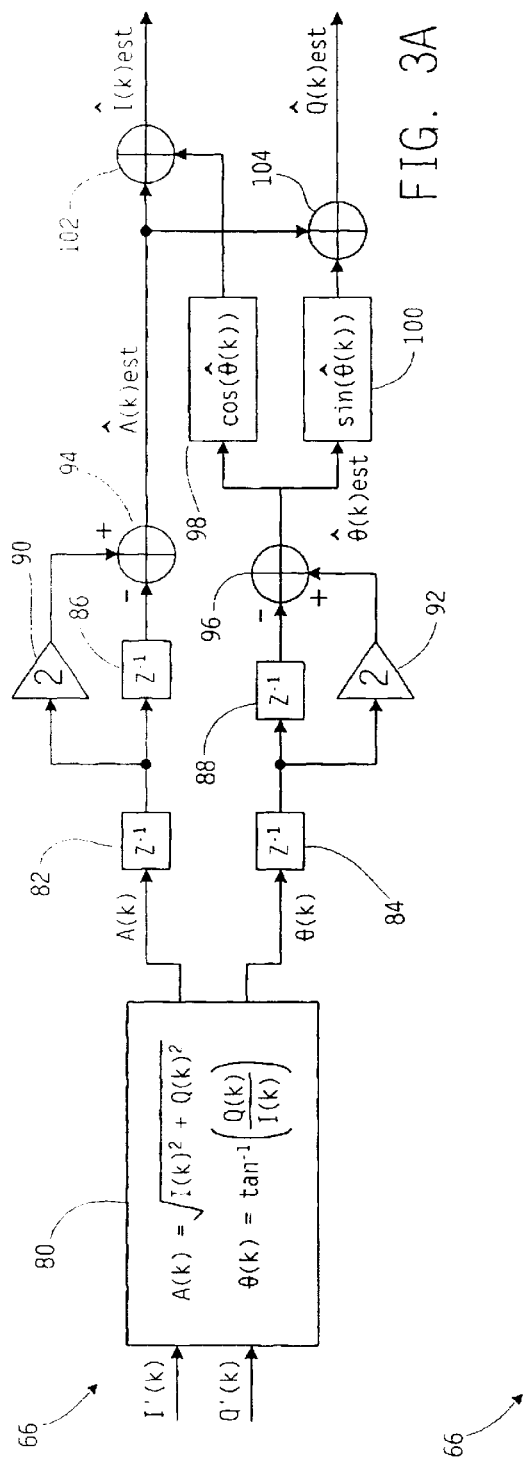
FIG. 3A is a detailed block diagram of the data estimator included in the advanced asynchronous pulse detector in accordance with an embodiment of the present invention.
FIG. 3B is a detailed block diagram of the data estimator included in the advanced asynchronous pulse detector in accordance with another embodiment of the present invention.

The I(k) and Q(k) quadrature data are input from the A/D converters 42 and 44 into an asynchronous pulse detector (APD) 46 in accordance with the present invention. The APD 46 serves to detect and remove asynchronous pulses which might be caused due to an interfering radar system. As is discussed below in more detail in relation to FIGS. 3–4, the APD 46 includes an estimator which uses the output of the asynchronous pulse detector to estimate replacement data. Since the output of the APD 46 is theoretically free of asynchronous pulses, the estimator is much less likely to calculate replacement data from data containing asynchronous pulses. This greatly reduces the probability of false alarms causing the insertion of asynchronous pulses into the output data. In addition, the APD 46 is designed so as to be capable of removing consecutive asynchronous pulses appearing in groups such as two or three. This is highly desirable as asynchronous pulses frequently occur in groups of two or three.

The APD 46 outputs quadrature data I'(k) and Q'(k), respectively representing the I(k) and Q(k) data corrected to account for any asynchronous pulses which have been detected and removed. The I'(k) and Q'(k) data are input to a signal processing section 48 such as that found in conventional pulse radar systems. The signal processing section 48 includes, for example, a filter (not shown) which operates on the I'(k) and Q'(k) data to determine the spectrum of the received radar return. Such filters, or digital filter banks, are well known in the art and may be implemented with fast Fourier transform (FFT) filters (see for example the Radar Handbook by M. I. Skolnik, McGraw Hill Publishing Co., copr. 1970, pp. 35–14 thru 35-16).

The signal processing section 48 provides an output indicative of the velocity of the tracked vehicles. This output may be stored in memory and/or presented on a display 50 at an address corresponding to each range gate, as is conventional. Because the APD 46 has detected and removed any asynchronous pulses found in the received radar return, the integrity of the results of the signal processing section 48 is greatly increased as will be appreciated.

Figure 2:
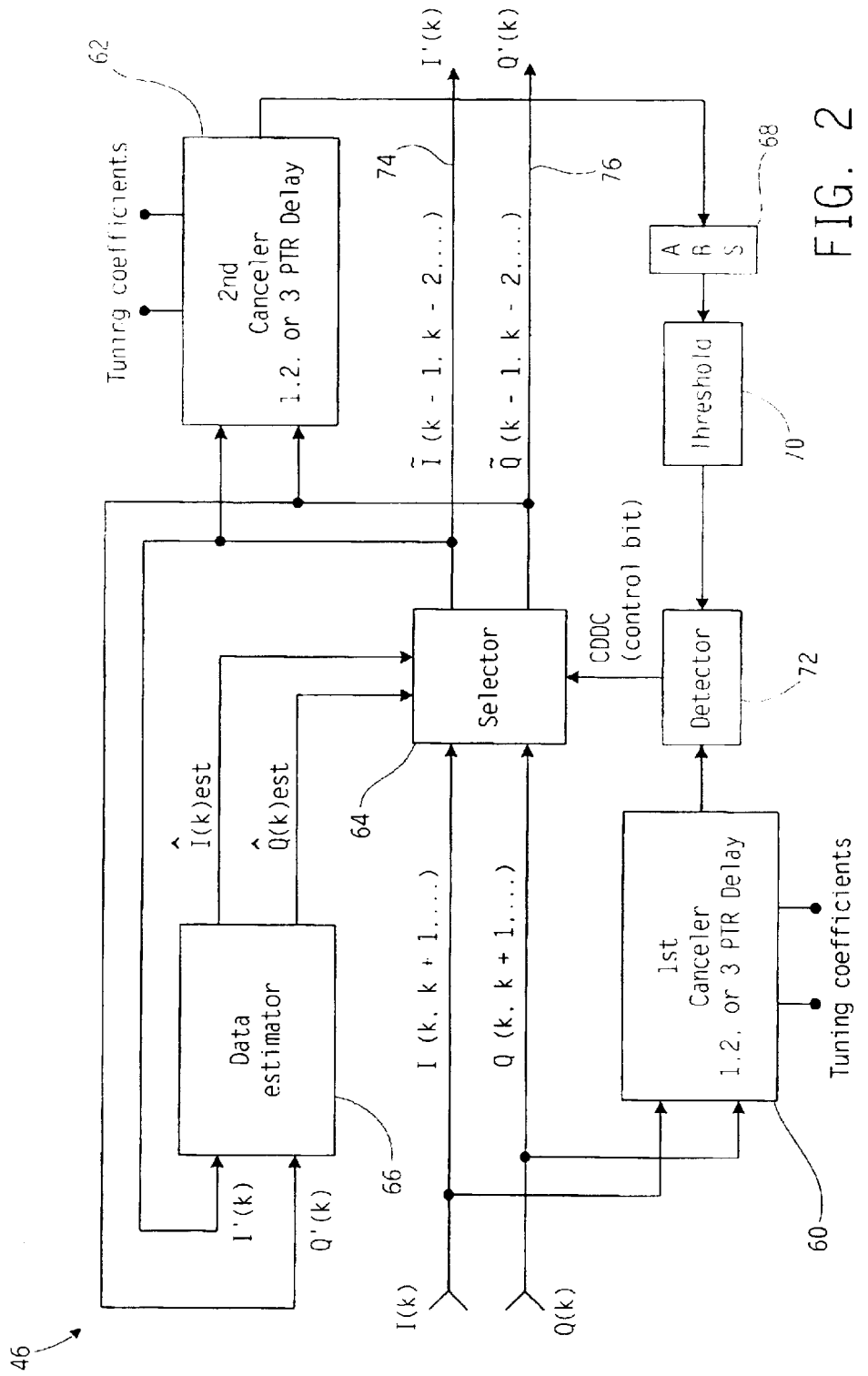
FIG. 2 is a block diagram of the advanced asynchronous pulse detector in accordance with an embodiment of the present invention.

Referring now to FIG. 2, the APD 46 is illustrated in detail in accordance with the present invention. The APD 46 includes the following primary functional components: first canceler 60 and second canceler 62; selector 64; data estimator 66; absolute value detector 68: threshold calculator 70; and detector 72. The selector 64 receives as inputs the incoming I(k) and Q(k) data, along with estimated I(k)$_{est}$ and Q(k)$_{est}$ data output from the data estimator 66. The selector 64 also receives a control signal CDDC from the detector 72. When the APD 46 does not detect an asynchronous pulse in the I(k) and Q(k) data, the selector 64 passes the I(k) and Q(k) data through the selector 64 onto lines 74 and 76, respectively, which serve as the output of the APD 46. On the other hand, if the APD 46 detects an asynchronous pulse in the I(k) and Q(k) data, the detector 72 causes the selector 64 to insert the estimated I(k)$_{est}$ and Q(k)$_{est}$ data from the data estimator 66 onto lines 74 and 76. In this manner, if the APD 46 detects an asynchronous pulse the asynchronous pulse data is replaced with the estimated data in order to remove the asynchronous pulse from the data prior to being input to the signal processing section 48 (FIG. 1).

As will be explained in more detail in regards to FIGS. 3A–3B, the data estimator 66 estimates the values of the I(k) and Q(k) data in the absence of any asynchronous pulses. The output of the APD 46, namely the corrected data I'(k) and Q'(k), serve as the input to the data estimator 66 as shown in FIG. 2. Based on the output of the APD 46, which theoretically does not include any asynchronous pulses, the data estimator 66 estimates the values of the I(k) and Q(k) data. In this manner, should the APD 46 detect an asynchronous pulse the selector 64 causes the incoming I(k) and Q(k) data to be replaced with the corresponding estimated data I(k)$_{est}$ and Q(k)$_{est}$.

The first canceler 60 receives as its input the I(k) and Q(k) data from the A/D converters 42 and 44. Conversely, the second canceler 62 receives as its input the output of the APD 46, namely the corrected data I'(k) and Q'(k). As will be described in more detail below with respect to FIG. 4, the first and second cancelers 60 and 62 have the same general configuration. Each canceler includes a delay-line moving target indicator (MTI) filter, followed by a magnitude operation, followed by another delay-line MTI filter. The first MTI filter serves to remove any clutter from the incoming signal. The magnitude operation, followed by the other MTI filter, removes target signals from the incoming data stream. This leaves only asynchronous pulses and noise as an output from the respective cancelers.

The input to the second canceler 62 theoretically does not include any asynchronous pulses. Thus, the output of the second canceler 62 primarily represents the system noise in the received signal. The output of the second canceler 62 is fed through the absolute value detector 68 which detects the absolute value and provides it to the threshold calculator 70. The threshold calculator 70 computes a threshold value based on the input in accordance with a predefined criteria, and provides the threshold value to the detector 72. The particular criteria used for generating the threshold can be any suitable criteria, the details of which are not germane to the present invention.

The first canceler 60, on the other hand, will receive asynchronous pulses at times due to mutual interference with another radar system, etc. Thus, the output of the first canceler 60 will at times include asynchronous pulses in addition to any system noise. The output of the first canceler 60 is input to the detector 72. In turn, the detector 72 compares the output of the first canceler 60 with the threshold value provided by the threshold calculator 70. In the event the output of the first canceler 60 exceeds the threshold value thus indicating the presence of an asynchronous pulse, the detector 72 causes the selector 64 to replace the I(k) and Q(k) data with the corresponding estimated data from the data estimator 66. Else, should the output of the first canceler 60 remain below the threshold value the detector 72 causes the corresponding I(k) and Q(k) data to pass through the selector 64.

The data estimator 66 may be any suitable element for estimating the values of the I(k) and Q(k) data in the absence of any asynchronous pulses. In a exemplary embodiment, a predictive filter is used as the data estimator. FIGS. 3A and 3B illustrate different embodiments of the data estimator 66, although it will be appreciated that the present invention is not intended to be limited thereto.

FIG. 3A illustrates one embodiment of the data estimator 66 which utilizes look-up tables. The output data I'(k) and Q'(k) of the APD 46 are input to a computation section 80 which calculates the amplitude A(k) and angle θ(k) of the input data as follows:

$$A(k) = \sqrt{I(k)^2 + Q(k)^2}$$
$$\theta(k) = \tan^{-1}\left(\frac{Q(k)}{I(k)}\right)$$

The calculated values of A(k) and θ(k) are respectively input into first PRT delays 82 and 84, followed by second PRT delays 86 and 88. The outputs of the first delays 82 and 84 are fed forward through filter gain stages 90 and 92. The outputs of the gain stages 90 and 92 are combined with the outputs of the second PRT delays 86 and 88, respectively, via adders 94 and 96. The output of the adders 94 and 96 represent the estimated amplitude A(k)$_{est}$ and angle θ(k)$_{est}$. The angle θ(k)$_{est}$ is used to access look-up tables 98 and 100 to obtain the cosine and sine values of the angle θ(k)$_{est}$. The estimated amplitude A(k)$_{est}$ and angle θ(k)$_{est}$ values are then multiplied by the sine and cosine values, respectively, via multipliers 102 and 104 to produce the estimated I(k)$_{est}$ and Q(k)$_{est}$ values.

FIG. 3B illustrates another embodiment of the data estimator 66 which is equivalent in result to the embodiment of FIG. 3A. Rather than utilize look-up tables 98 and 100, the embodiment of FIG. 3B simply calculates the estimated I(k)$_{est}$ and θ(k)$_{est}$ values based on the output data I'(k) and Q'(k) of the APD 46 based on filter equations as follows:

$$\hat{I}(k)_{est} = \left[2\sqrt{\frac{I'(k-1)^2 + Q'(k-1)^2}{I'(k-2)^2 + Q'(k-2)^2}} - 1\right]$$
$$\left[I'(k-2)\left(\frac{2I'(k-1)^2}{I'(k-1)^2 + Q'(k-1)^2} - 1\right) + 2\frac{I'(k-1)Q'(k-1)Q'(k-2)}{I'(k-1)^2 + Q'(k-1)^2}\right]$$

$$\hat{Q}(k)_{est} = \left[-2\sqrt{\frac{I'(k-1)^2 + Q'(k-1)^2}{I'(k-2)^2 + Q'(k-2)^2}} + 1\right]\left[Q'(k-2)\right.$$
$$\left.\left(\frac{2I(k-1)^2}{I'(k-1)^2 + Q'(k-1)^2} - 1\right) - 2\frac{I'(k-1)Q'(k-1)I'(k-2)}{I'(k-1)^2 + Q'(k-1)^2}\right]$$

Of course, the embodiment for the data estimator 66 as illustrated in FIG. 3B is considerably more computation intensive. Thus, an embodiment such as that shown in FIG. 3A may be preferable in the event sufficient computational power for the embodiment of FIG. 3B is not available.

In either embodiment, however, it is noted that the input to the data estimator 66 is taken from the output of the APD 46. As noted above, the output of the APD 46 is theoretically free of asynchronous pulses as any asynchronous pulses in the input data have been detected and removed. Thus, the reliability of the data estimator 66 is greatly increased as it is based on data which is more probable to be free of asynchronous pulses.

Figure 4:
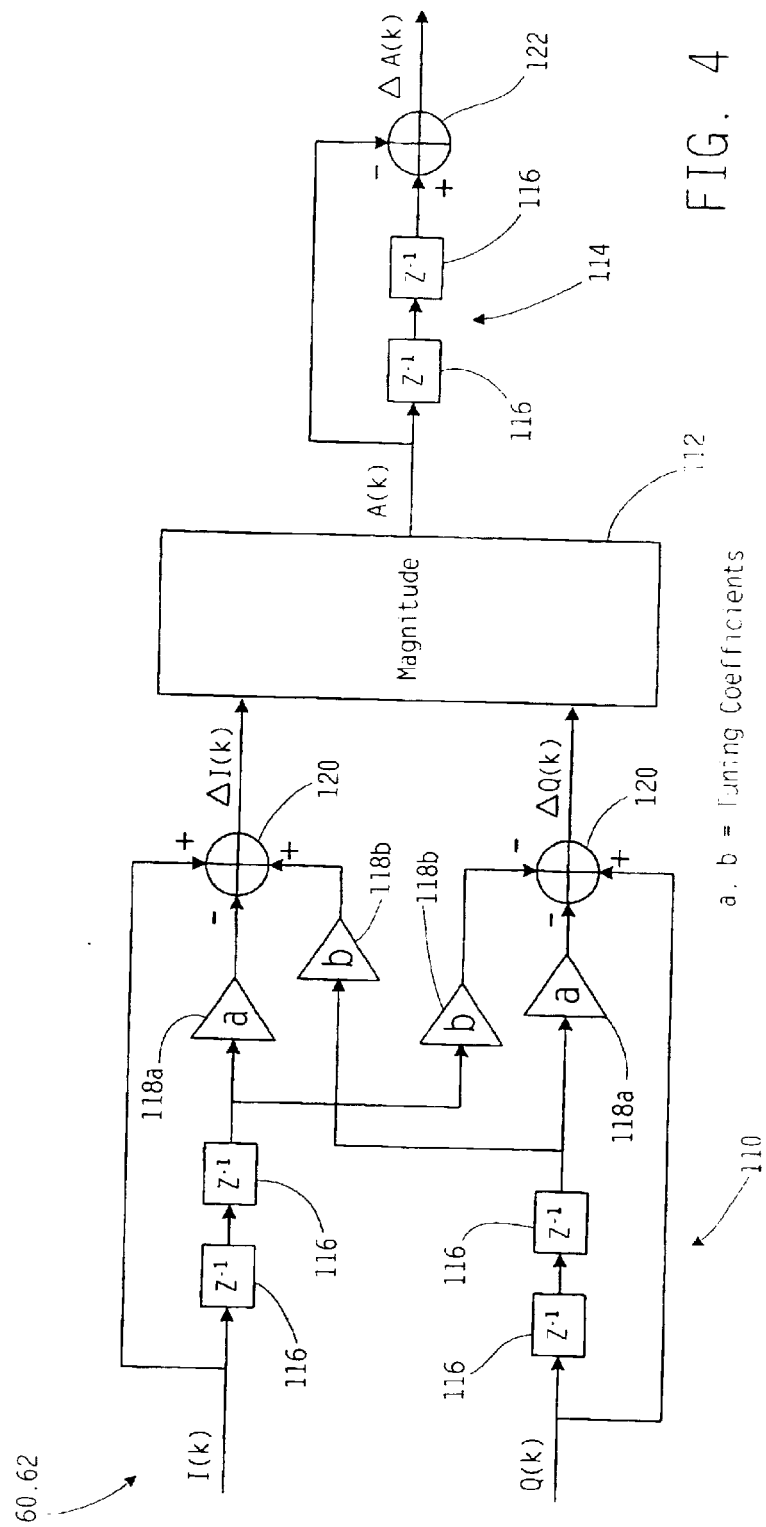
FIG. 4 is a detailed block diagram of the first and second cancelers included in the advanced asynchronous pulse detector in accordance with an embodiment of the present invention.

FIG. 4 illustrates the configuration of the first and second cancelers 60 and 62. Since the configuration is the same for each canceler, the details will be explained only with respect to the first canceler 60. However, those having ordinary skill in the art will appreciate how such description equally applies to the second canceler 62.

As shown in FIG. 4, the first canceler 60 includes a delay-line MTI filter 110, followed by a magnitude operator block 112, followed by another delay-line MTI filter 114. The first MTI filter 110 includes two delay lines 116 in series for each of the I(k) and θ(k) data signals. In another embodiment, the MTI filter 110 includes three or more delay lines 116 in series. Each delay line represents a PRT delay. Amplifiers 118a and 118b together with adders 120 combine the I(k) and Q(k) data signals to generate ΔI(k) and ΔQ(k) data signals which are input to the magnitude operator block 112. The gains "a" and "b" of amplifiers 118a and 118b are based on tuning coefficients which are predetermined and input to the first canceler 60 as is otherwise conventional. For example, the tuning coefficients can be calculated from the output of the clutter tracker, clutter doppler, etc.

As will be appreciated by those having ordinary skill in the art, the MTI filter 110 serves to remove any clutter from the incoming signal. The magnitude operator 112 computes the output magnitude value A(k) as the square root of $\Delta I(k)^2 + \Delta Q(k)^2$. The value A(k) is input into the second MTI filter 114 which, like the first MTI filter 110, includes two delay lines 116 in series. In another embodiment, the MTI filter 114 includes three or more delay lines 116 in series. The input to the first delay line 116 in the MTI filter 114 is fed forward and combined with the output of the second delay line 116 via an adder 122. The output of the adder 122 represents ΔA(k), and serves as the output of the first canceler 60.

The magnitude operator 112 followed by the MTI filter 114 removes target signals from the incoming data stream. Thus, only asynchronous pulses and noise may remain in the output of the canceler 60.

In the past, APDs included cancelers with only a single delay line in the MTI filters. Such APDs were not capable of detecting and handling consecutive asynchronous pulses. However, in accordance with the present invention each MTI filter 114 includes a plurality of delay lines 116. In an embodiment which includes two delay lines 116 such as that shown in FIG. 4, the APD 46 is capable of detecting and removing two consecutive asynchronous pulses. In an embodiment which includes three delay lines 116 in each MTI filter, the APD 46 is capable of detecting and removing up to three consecutive asynchronous pulses.

Accordingly, the present invention provides an improved asynchronous pulse detector for detecting and removing asynchronous pulses. The asynchronous pulse detector is not susceptible to inserting an asynchronous pulse into the data stream rather than removing it in the case of a false alarm. Moreover, the asynchronous pulse detector is capable of removing asynchronous pulses appearing even in groups of two, three or even more, from the data stream.

Although the invention has been shown and described with respect to certain preferred embodiments, it is obvious that equivalents and modifications will occur to others skilled in the art upon the reading and understanding of the specification. For example, although a particular architecture is described for the system and its components in FIGS. 1–4, it will be appreciated that the present invention is not intended to be limited thereto. The present invention has application to various different architectures without departing from the scope of the invention. The present invention includes all such equivalents and modifications, and is limited only by the scope of the following claims.

What is claimed is:

1. A pulse radar receiver, comprising:
   front end circuitry for receiving a pulse radar return signal;
   an asynchronous pulse detector for detecting and removing asynchronous pulses from the return signal and outputting a corrected return signal; and
   radar processing circuitry for processing the corrected return signal to produce a radar output,
   wherein the asynchronous pulse detector comprises:
      a data estimator which estimates the return signal based on the corrected return signal;
      a detector for detecting an asynchronous pulse in the return signal; and
      a selector for selectively outputting the estimated return signal in place of the return signal as the corrected return signal in the event the detector detects an asynchronous pulse in the return signal.

2. The receiver of claim 1, wherein the data estimator comprises a predictive filter element.

3. The receiver of claim 2, wherein the data estimator estimates a current return signal sample based on at least one previous corrected return signal sample.

4. The receiver of claim 1, wherein the data estimator comprises a look-up table.

5. The receiver of claim 1, wherein the data estimator does not comprise a look-up table.

6. The receiver of claim 1, wherein the selector comprises a first canceler for identifying asynchronous pulses and noise in the return signal, a second canceler for identifying noise in the corrected return signal, and a detector for controlling the output of the selector based on a comparison of outputs of the first and second cancelers.

7. The receiver of claim 6, wherein the first and second cancelers each comprise means for identifying a plurality of consecutive asynchronous pulses.

8. The receiver of claim 1, wherein the front end circuitry includes an analog-to-digital (A/D) converter for digitizing the return signal, and the asynchronous pulse detector operates on the digitized return signal.

9. The receiver of claim 8, wherein the asynchronous pulse detector is coupled directly to an output of the A/D converter.

10. A method of processing a pulse radar return signal, the method comprising the steps of:
    receiving a pulse radar return signal;
    detecting and removing asynchronous pulses from the return signal and outputting a corrected return signal; and
    processing the corrected return signal to produce a radar output,
    wherein the step of detecting and removing asynchronous pulses comprises:
       estimating the return signal based on the corrected return signal;
       detecting an asynchronous pulse in the return signal; and
       outputting the estimated return signal in place of the return signal as the corrected return signal in the event an asynchronous pulse is detected in the return signal.

11. The method of claim 10, wherein the estimating step comprises using a predictive filter element.

12. The method of claim 11, wherein the estimating step comprises estimating a current return signal sample based on at least one previous corrected return signal sample.

13. An asynchronous pulse detector for detecting and removing asynchronous pulses from an input signal and outputting a corrected input signal, comprising:

a data estimator which estimates the input signal based on the corrected input signal;

a detector for detecting an asynchronous pulse in the input signal; and a selector for selectively outputting the estimated input signal in place of the input signal as the corrected input signal in the event the detector detects an asynchronous pulse in the input signal.

14. The asynchronous pulse detector of claim 13, wherein the data estimator comprises a predictive filter element.

15. The asynchronous pulse detector of claim 14, wherein the data estimator estimates a current input signal sample based on at least one previous corrected input signal sample.

16. The asynchronous pulse detector of claim 13, wherein the data estimator comprises a look-up table.

17. The asynchronous pulse detector of claim 13, wherein the data estimator does not comprise a look-up table.

18. The asynchronous pulse detector of claim 13, wherein the selector comprises a first canceler for identifying noise in the input signal, a second canceler for identifying asynchronous pulses and noise in the corrected input signal, and a detector for controlling the output of the selector based on a comparison of outputs of the first and second cancelers.

19. The asynchronous pulse detector of claim 18, wherein the first and second cancelers each comprise means for identifying a plurality of consecutive asynchronous pulses.

20. A canceler for identifying asynchronous pulses in an input signal, the canceler comprising:

an input for receiving the input signal; and means for passing a plurality of consecutive asynchronous pulses in the input signal while removing clutter and target signals from the input signal.

21. The canceler of claim 20, wherein the means for passing comprises a first delay-line moving target indicator having a delay equal to a multiple number of a pulse repetition time (PRT), a magnitude operator, and a second delay-line moving target indicator having a delay equal to a multiple number of the pulse repetition time (PRT).

\* \* \* \* \*